United States Patent
Hirsch

(10) Patent No.: US 9,647,714 B2
(45) Date of Patent: *May 9, 2017

(54) APPARATUS TO ASSIST A USER WITH HOLDING A MOBILE DEVICE

(71) Applicant: Allen Hirsch, New York, NY (US)

(72) Inventor: Allen Hirsch, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/081,610

(22) Filed: Mar. 25, 2016

(65) Prior Publication Data

US 2016/0211879 A1 Jul. 21, 2016

Related U.S. Application Data

(63) Continuation of application No. 14/449,858, filed on Aug. 1, 2014, now Pat. No. 9,300,346.

(51) Int. Cl.
| | |
|---|---|
| *H04M 1/00* | (2006.01) |
| *H04B 1/3888* | (2015.01) |
| *A45F 5/00* | (2006.01) |
| *A45F 5/02* | (2006.01) |
| *H04B 1/3827* | (2015.01) |

(52) U.S. Cl.
CPC ............ *H04B 1/3888* (2013.01); *A45F 5/00* (2013.01); *A45F 5/021* (2013.01); *H04B 1/385* (2013.01); *A45C 2200/15* (2013.01); *A45F 2005/008* (2013.01); *A45F 2200/0516* (2013.01); *H04B 2001/3861* (2013.01)

(58) Field of Classification Search
CPC ................. A45F 5/00; A45F 2005/008; A45F 2200/0516; H04B 2001/3861
See application file for complete search history.

(56) References Cited

U.S. PATENT DOCUMENTS

| | | |
|---|---|---|
| 4,211,445 A | 7/1980 | Woods |
| 6,016,248 A | 1/2000 | Anzai et al. |
| 6,217,095 B1 | 4/2001 | Yamada |
| 6,250,553 B1 | 6/2001 | Beseth |
| 6,418,010 B1 | 7/2002 | Sawyer |
| 6,975,507 B2 | 12/2005 | Wang et al. |
| 7,364,126 B2 | 4/2008 | Tsai et al. |

(Continued)

FOREIGN PATENT DOCUMENTS

JP 2006-279907 A 10/2006

OTHER PUBLICATIONS

Web page at http://shop.flygrip.com/collections/flygrip-unmounted/products/booming-blue; Sep. 20, 2013.

(Continued)

*Primary Examiner* — Duc M Nguyen
(74) *Attorney, Agent, or Firm* — Louis J. Hoffman; William E. Markov

(57) ABSTRACT

An apparatus that facilitates one-handed use of a mobile device has a finger brace configured to brace a user's finger on each of two opposed sides of the point where it is coupled to a flexible member. The flexible member extends through a hole in the back portion of the mobile device's case and is anchored to an interior surface of the back portion of the case. The flexible member's length is such that two fingers of the user's hand can press against the finger brace to brace the mobile device when the two fingers are between the finger brace and the case.

16 Claims, 14 Drawing Sheets

(56) References Cited

U.S. PATENT DOCUMENTS

| | | |
|---|---|---|
| 8,428,664 B1 | 4/2013 | Wyers |
| 8,528,798 B2 | 9/2013 | Chen |
| 8,737,066 B1 | 5/2014 | Block |
| 8,950,638 B2 | 2/2015 | Wangercyn, Jr. et al. |
| 9,137,915 B2 * | 9/2015 | McCurdy ............ A45C 13/002 |
| 9,300,346 B2 * | 3/2016 | Hirsch ................. H04B 1/385 |
| 2007/0181620 A1 | 8/2007 | Carver |
| 2009/0090750 A1 | 4/2009 | Alcenat |
| 2009/0261216 A1 | 10/2009 | Yang et al. |
| 2009/0270050 A1 | 10/2009 | Brown |
| 2011/0192857 A1 | 8/2011 | Rothbaum et al. |
| 2011/0266316 A1 | 11/2011 | Ghalib et al. |
| 2012/0025039 A1 | 2/2012 | Segal |
| 2012/0031937 A1 | 2/2012 | Baker |
| 2012/0042476 A1 | 2/2012 | Karmatz |
| 2012/0043452 A1 | 2/2012 | Karmatz |
| 2012/0048873 A1 | 3/2012 | Hyseni |
| 2012/0113572 A1 | 5/2012 | Gaddis et al. |
| 2012/0118770 A1 | 5/2012 | Valls et al. |
| 2012/0267402 A1 | 10/2012 | Beatty |
| 2012/0326003 A1 | 12/2012 | Solow et al. |
| 2013/0146625 A1 | 6/2013 | Karle et al. |
| 2013/0148271 A1 | 6/2013 | Huang |
| 2013/0206942 A1 | 8/2013 | Trotsky |
| 2013/0240580 A1 | 9/2013 | Yu |
| 2014/0091116 A1 | 4/2014 | Yu |
| 2015/0115112 A1 | 4/2015 | Noh |

OTHER PUBLICATIONS

Web page at http://www.lazy-hands.com/buynow.html; Sep. 20, 2013.

Review: Handable Tablet and Cell Phone Holder at http://www.runaroundtech.com/2013/02/20/review-handable-tablet-and-cell-phone-holder/; Feb. 20, 2013.

Larson, Peter; Review: HB Tune Hand-Held iPhone Case; at http://runblogger.com/2012/06/review-hb-tune-hand-held-iphone-case.html; Jun. 17, 2012.

* cited by examiner

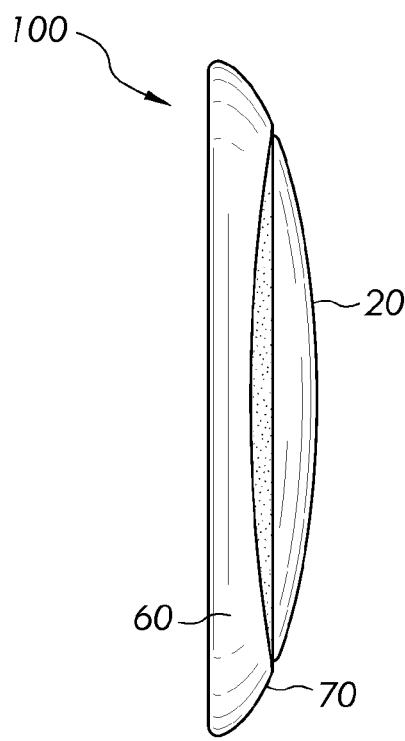 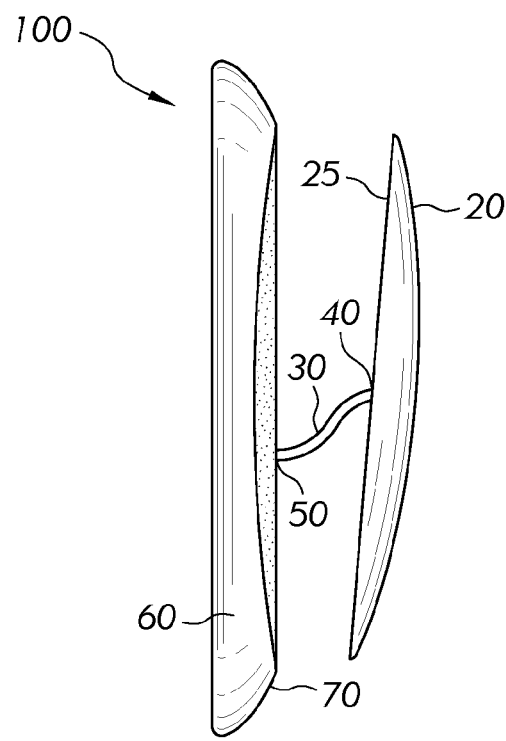
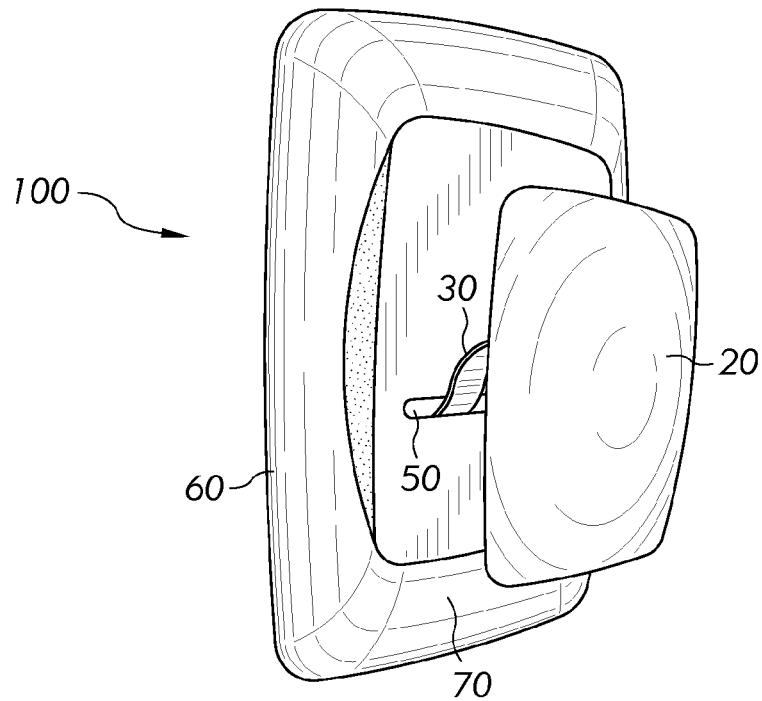

APPARATUS TO ASSIST A USER WITH HOLDING A MOBILE DEVICE

CROSS-REFERENCE TO RELATED APPLICATIONS

This application is a continuation of application Ser. No. 14/449,858, filed Aug. 1, 2014, now U.S. Pat. No. 9,300,346.

BACKGROUND

The field of the present invention relates to accessories for hand-held mobile devices such as mobile phones and computer tablets. In particular, the field of the present invention relates to an apparatus that assists a user with holding a mobile device that has a front-facing display screen, where the user can hold the device in one hand while leaving the thumb of that hand, as well as the user's other hand, free to operate the mobile device.

Mobile devices, such as cellular phones or tablets, typically have front-facing display screens, which can be a touch-screen. In addition, mobile devices typically include integral cases. In addition, some mobile device users purchase a secondary case that partially or entirely covers the mobile device's integral case and provides additional protection. Cases can be made with any material that is rigid enough to hold its shape and protect the components of the mobile device, but cases often are made of a sufficiently low-density material so as to minimize the weight added to the mobile device. Typical materials used in cases include metal, carbon fiber, and plastic.

A case, whether integral or secondary, has a rear-facing back portion that is positioned on the opposite side of the device from the display screen. The exterior surface of the back portion of the case faces away from the mobile device and toward the palm of the user's hand when the mobile device is held with a typical grip. The exterior surface can be smooth or otherwise have a low coefficient of friction that causes the device to be difficult to grip. In the alternative, some cases have an exterior surface that is textured or coated with a material that improves the user's ability to grip the case (e.g., rubber or leather). However, even with a textured or coated case, many users still find difficulty with gripping the mobile device, particularly when operating the mobile device while performing other tasks.

A wide variety of accessories are available for supporting use of a hand-held device. However, conventional accessories generally rely on rigid designs that are not easily adjustable or customizable to a user's individual hand. Also, such designs typically do not provide for a smooth transition from holding the device in portrait orientation to holding it in a landscape orientation, without having to detach from and reattach the accessory to the mobile device.

SUMMARY

An apparatus to assist a user with holding a mobile device comprises a finger brace and a flexible member coupled to the finger brace at an intermediate point. The finger brace is sized and shaped to brace at least one finger on each of two opposed sides of the intermediate point.

The flexible member extends through a hole in the back portion of the mobile device's case and is anchored to the interior surface of the back portion of the case.

The length of the flexible member between the hole and the finger brace is such that at least two fingers of a user's hand can press against the finger brace to brace the mobile device when the user is holding the mobile device in a fashion where at least two fingers of the same hand are positioned between the finger brace and the case.

The apparatus facilitates one-handed use of the mobile device by allowing the user to hold the mobile device with one hand while leaving the thumb of the user's same hand free to operate the mobile device.

Objects and advantages pertaining to an apparatus to assist a user with holding a mobile device may become apparent upon referring to the example embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1A and 1B are side views of an embodiment of the apparatus.

FIG. 1C is a perspective view of the embodiment of FIGS. 1A and 1B.

Figure 2A:
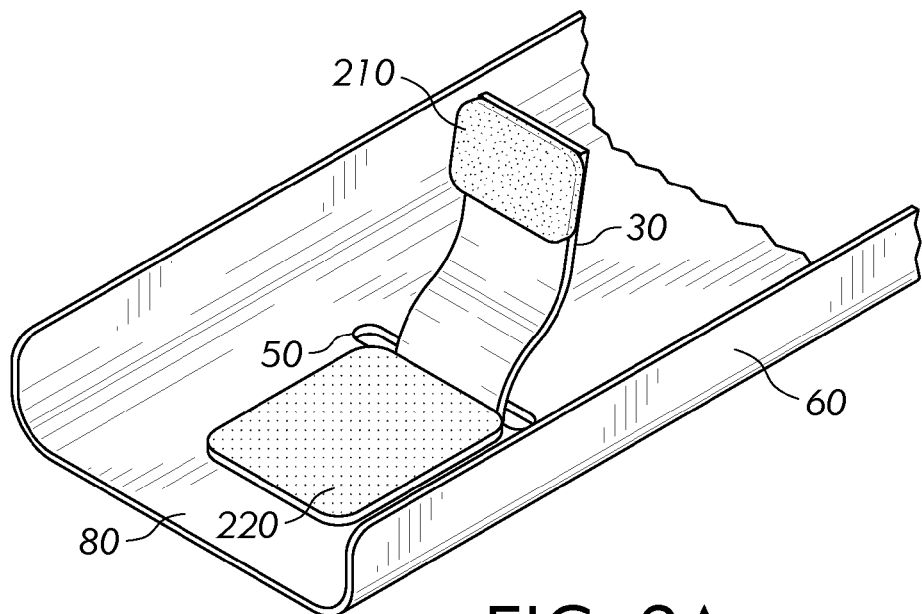
FIGS. 2A and 2B are perspective views of the interior surface of the rear-facing back portion of a case and the portion of the flexible member extending through the hole, as used with various embodiments of the apparatus, which could be combined with the embodiments in FIGS. 1A-1C.

It should be noted that the embodiments depicted are shown only schematically, and that not all features may be shown in full detail or in proper proportion. Certain features or structures may be exaggerated relative to others for clarity. It should be noted further that the embodiments shown are examples only, and should not be construed as limiting the scope of the present disclosure or appended claims.

DETAILED DESCRIPTION OF EMBODIMENTS

An example apparatus to assist with holding a mobile device is shown in FIGS. 1A, 1B, and 1C. The example apparatus includes finger brace 20 and flexible member 30 coupled to the finger brace at intermediate point 40. The flexible member extends through hole 50 in the rear-facing back portion 60 of the mobile device's case 100 and is anchored to the interior surface 80 of the back portion 60 of the case 100. The exterior surface 70 of the rear-facing back portion 60 of case 100 is visible in FIGS. 1A, 1B, and 1C, but interior surface 80 is shown only in other drawings.

Figure 15:
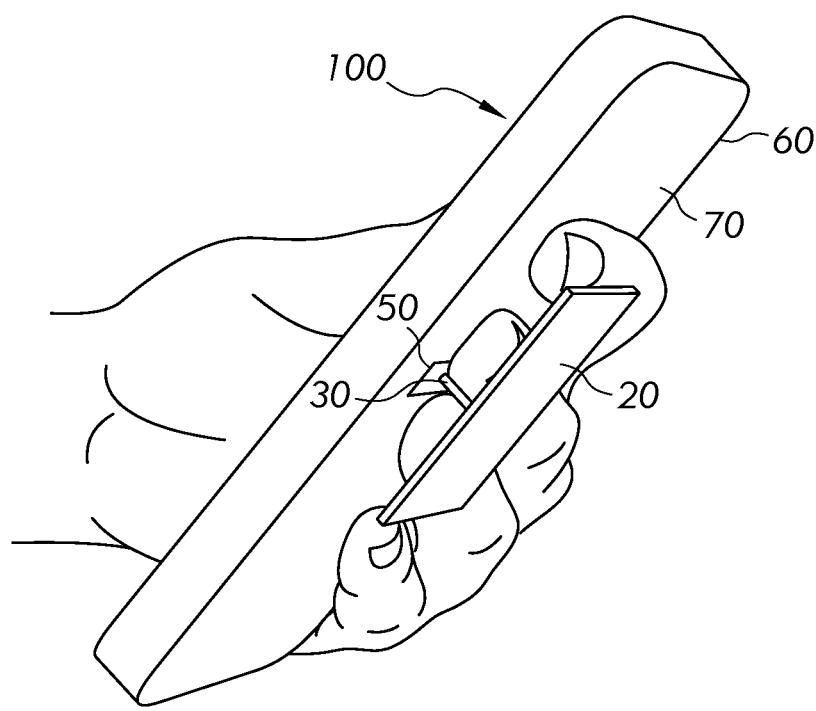
FIG. 15 is a perspective view showing an embodiment being held by a user's hand.

FIG. 15 shows an embodiment of the apparatus in use. In the embodiment shown, at least two fingers of one hand of the user are placed on either side of flexible member 30. The user's fingers are between finger brace 20 and exterior surface 70 of the rear-facing back portion 60 of case 100. The user can press against finger brace 20 to brace the mobile device, thereby leaving the user's thumb free to operate the mobile device.

Figure 18:
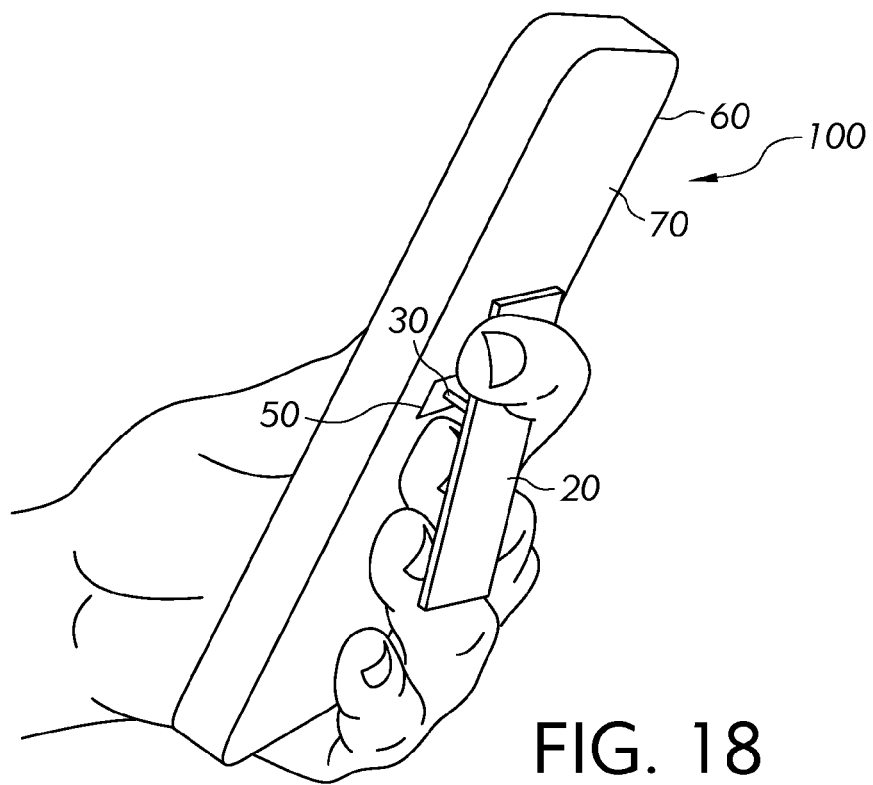
FIG. 18 is a perspective view showing the embodiment of FIG. 15 with the user holding the mobile device using an alternative grip.

FIG. 18 shows the embodiment of FIG. 15 where the user has placed a finger between finger brace 20 and exterior surface 70 of the rear-facing back portion 60 of case 100 on one side of finger brace 20 and another finger on the opposite side of finger brace 20. In this configuration, the user can brace the mobile device using finger brace 20 as a cantilever.

Finger brace 20 can be made of a material (or combination of materials) that is rigid and that is resilient enough to counterbalance the force applied by the user's fingers with relatively little change in shape, such as plastic, carbon fiber, and metal. Alternatively, finger brace 20 can be moldable from a flat or planar shape into a shape preferred by the user. In such an embodiment, the finger brace can include a core made of a rigid but malleable material (e.g., a soft metal like aluminum) that can be bent by the user when sufficient force is applied but remains rigid when used as a finger brace in conjunction with holding the mobile device.

The entire surface of finger brace 20 can be textured, or it can be coated with a material that is soft to the touch or provides padding for the user's fingers (e.g., foam, cloth, leather, or rubber). Some embodiments can have a finger brace that is entirely coated with such a soft material. In other embodiments, only finger-bracing surface 25 is textured or padded. Texturing or padding can allow a better grip without as much slippage.

Figure 16:
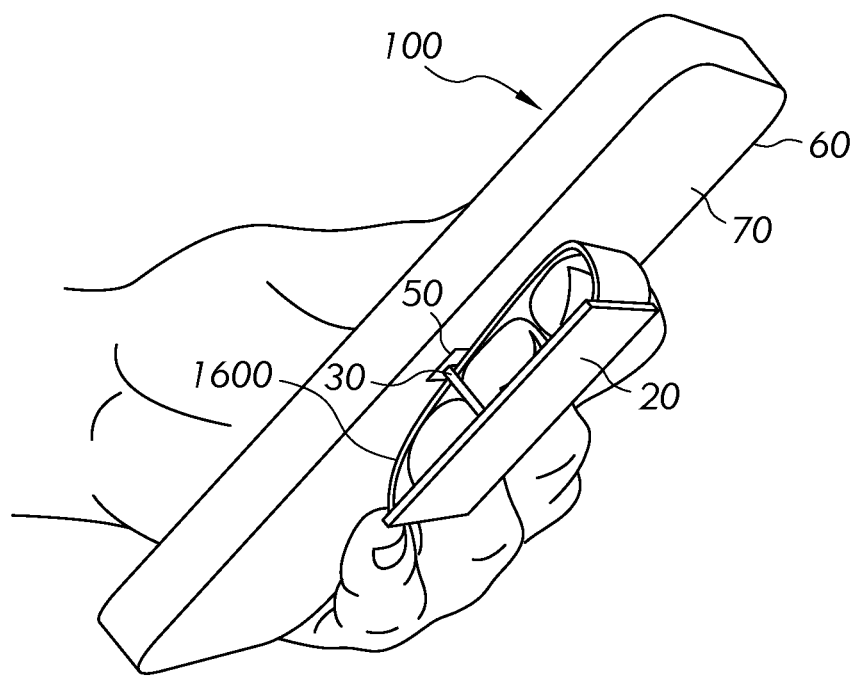
FIGS. 16 and 17 are perspective views showing additional embodiments with the finger brace having a strap partially enclosing the user's fingers.

FIG. 16 shows an embodiment where optional strap 1600 is attached to finger brace 20 and partially encircles the user's fingers. Strap 1600 can be attached to flexible member 30, as pictured in FIG. 16, formed as an extension of flexible member 30 (not shown), or wholly independent from flexible member 30. In an embodiment where the strap is attached to or integrated with the flexible member, the length of the flexible member can be adjusted by pulling it away from the finger brace.

Figure 17:
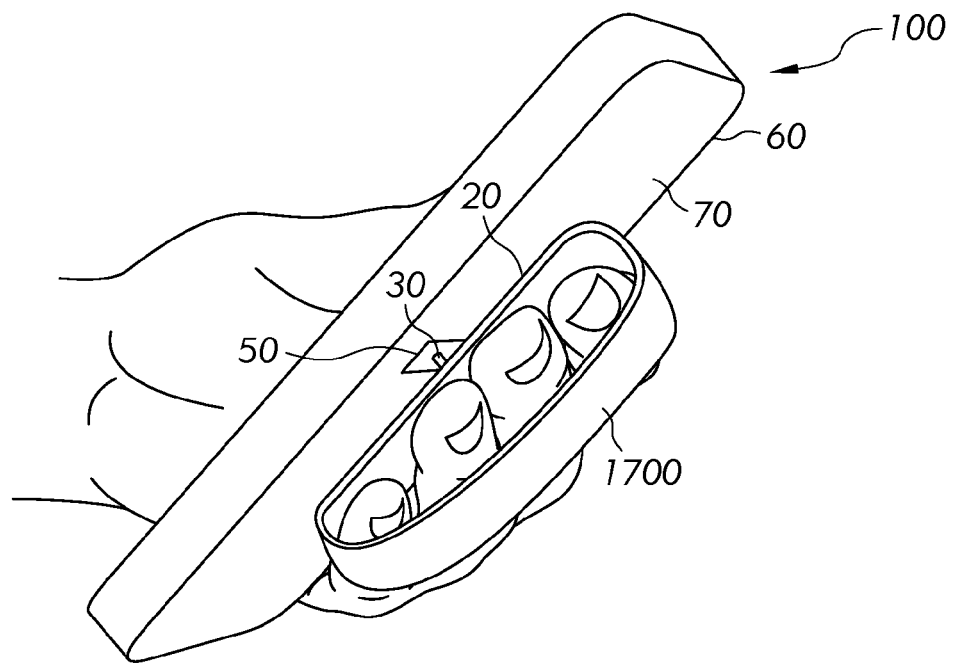

FIG. 17 shows an alternative to FIG. 16, with strap 1700 on the side of finger brace 20 opposite its attachment to flexible member 30. Similar alternatives discussed in connection with FIG. 16 can apply equally to FIG. 17.

In the example embodiment depicted in FIGS. 1A-1C, finger brace 20 has a flat finger-bracing surface 25. However, in other embodiments, the finger-bracing surface can be shaped to match the contours of the user's fingers. For example, the finger-bracing surface can be scalloped or fluted when viewed in profile. Such contours can be pre-molded. Alternatively, the finger-bracing surface can comprise a material that is moldable to the user's fingers so that it would provide a customizable fit. The perimeter of the finger-bracing surface can be rectangular, as shown in FIG. 1C, or can take other suitable shapes (e.g., triangular, circular, elliptical, hour-glass, or figure-8). The shape can be formed as an ornament or specialty shape, such as to assist marketing campaigns; such shapes can depict an object, animal, or company logo, for example. Alternatively, ornamental designs can be added to the shape with markings or engraving.

FIG. 1B shows flexible member 30 coupled to finger brace 20 at intermediate point 40. Intermediate point 40 can be equidistant from end points of finger-bracing surface 25, as shown, or can be positioned at a non-central point on finger-bracing surface 25, but whether central or not, it can be sized to leave enough space so that at least one finger can fit on each of two opposed sides of intermediate point 40. The radius of the average adult finger is between about 0.5 and about 1.5 centimeters. The intermediate point can be positioned so that less than a length approximating the radius of the average adult finger is provided on each of two opposed sides of the intermediate point, although such a configuration can cause user discomfort, particularly when a user holds the mobile device for an extended period of time. Also, finger brace 20 can have adjustable size (e.g., by sliding, telescoping, folding, cutting, or breaking along pre-scored lines), or in some cases the intermediate point's location changed (e.g., by sliding or allowing the user to adjust it to one of several notched locations), so that the fit can be customized to the user.

Flexible member 30 can be made of various flexible materials, including but not limited to, cloth, leather, rubber, and plastic. In some embodiments, flexible member 30 can be made of a material that has a dynamic length (e.g., elastic or rubber). Such materials, when stretched, exert a resisting force. That force provides an extra gripping force, assisting the user to hold the device in the user's hand. The resistive force provided by such a material's dynamic length, combined with the flexibility of flexible member 30, allows flexible member 30 to be twisted and stretched to accommodate the user's hand size and preference. In addition, the more flexible member 30 is stretched, the more the resistive force attempts to return flexible member 30 to its unloaded length, causing the finger brace to be held more tightly against the user's fingers. Even if flexible member 30 is not made of an elastic material, though, so that it has a fixed length, correct establishment of the length of flexible member 30, with respect to the user's hand, facilitates easy one-handed handling of the mobile device while the user is operating it, because finger brace 20 can automatically angle itself to fit comfortably against the user's fingers, most commonly by balancing forces on either side of attachment point 40, accommodating a wide array of different user holds.

Also, in some embodiments, the elasticity of flexible member 30 can hold finger brace 20 against the exterior surface 70 of the rear-facing back portion 60 of the case 100 when not in use or facilitate the cantilevered hold shown in FIG. 18.

Nonetheless, in many embodiments, flexible member 30 can be made of materials that have a relatively static length, such as cloth.

In the example embodiment shown in FIG. 1B, the flexibility of flexible member 30 enables the user to switch easily from holding the mobile device in a portrait orientation to holding it in a landscape orientation, merely by twisting the mobile device, causing a twist in flexible member 30, while finger brace 20 remains in place. That same flexibility also allows the user to move his or her fingers with respect to hole 50, without having to detach and reattach, or otherwise relocate, the apparatus with respect to the rear-facing back portion 60 of case 100, thereby providing a more universal fit without the need for customization. In addition, flexible member 30 increases user comfort by presenting a flexible surface between the user's fingers.

In some embodiments, flexible member 30 can be a strap (e.g., rectangular in shape) as depicted in FIG. 2A. Other embodiments can use alternative shapes for flexible member 30, e.g., a string, cord, or lace, or a plurality of straps, strings, cords, or laces. Flexible member 30 can be thin enough to fit between two fingers of a user's hand comfortably. Any shape suitable for accomplishing that goal can be used.

Flexible member 30 is long enough to allow the user's fingers to fit comfortably between the finger brace and the exterior surface of the rear-facing back portion of the case, but not so long as to prevent the user from effectively bracing his or her fingers against the finger brace.

Figure 14:
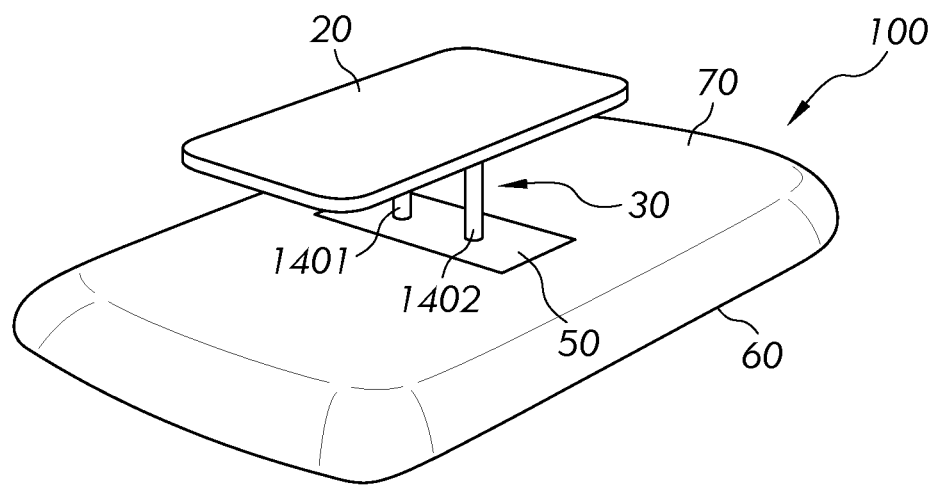
FIG. 14 is a perspective view showing an additional embodiment with a flexible member having multiple sections.

FIG. 14 shows an embodiment with flexible member 30 having two discrete portions (e.g., cords) separated by approximately the width of a finger. The embodiment can be used as described above, where flexible member 30 includes first portion 1401 and second portion 1402, both placed between the same two of the user's fingers. Alternatively, the user's hand can be rotated 90 degrees with respect to flexible member 30 of FIG. 14 (e.g., switching from portrait orientation to landscape orientation) and one finger of the user's hand can be placed in the gap between first portion 1401 and second portion 1402 of flexible member 30, and the user can brace the mobile device with that finger.

In certain embodiments, such as the embodiments in FIGS. 10A-11C, the length of flexible member 30 can be adjusted via its coupling to the finger brace. However, other embodiments can allow the length of the flexible member to be adjusted by varying where it is anchored to the interior surface of the rear-facing back portion of the case.

Figure 2B:
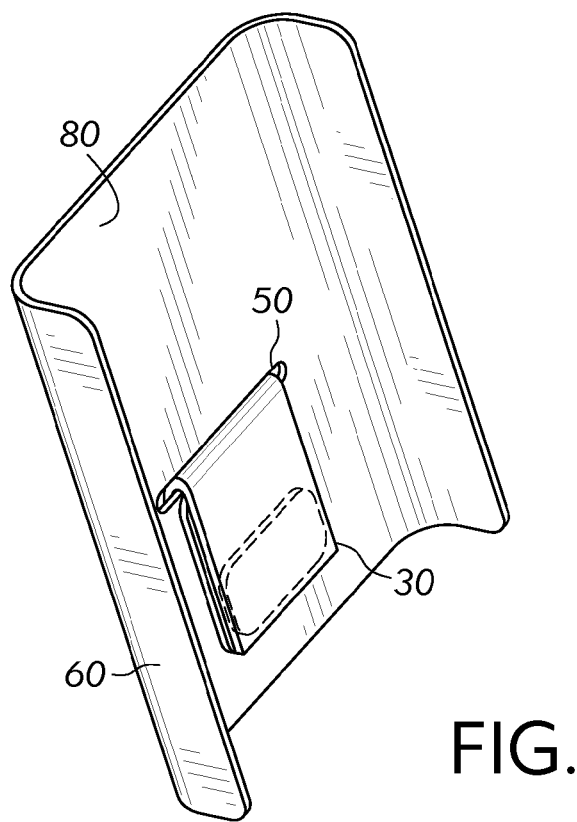

For example, FIGS. 2A and 2B show interior surface 80 of the rear-facing back portion 60 of case 100, hole 50 piercing the back portion 60, and a portion of flexible member 30 extending through hole 50. FIG. 2A depicts flexible member 30 in an unanchored state. FIG. 2B shows flexible member 30 in an anchored state.

In the embodiment shown in FIG. 2A, a hook-type fastener is shown on anchoring device 210 and corresponding loops on anchoring surface 220 on interior surface 80 of rear-facing back portion 60 of case 100. Use of adjustable fasteners, such as hook and loop, snaps, clips, or the like, can enable an individual user to adjust the length of flexible member 30 and thus customize the apparatus to fit his or her hand. In the embodiment of FIG. 2A, for example, a user can decrease the length of flexible member 30 by detaching anchor device 210 from anchoring surface 220 and re-attaching anchoring device 210 at a point farther from hole 50. Conversely, a user can increase the length of flexible member 30 by re-attaching anchoring device 210 at a point nearer to hole 50.

In other embodiments, flexible member 30 can be held in place between interior surface 80 of the rear-facing back portion 60 of case 100 and an adjacent surface (not shown) of the mobile device, e.g., by creating a pressure fit. In an embodiment that uses a pressure-fit anchor design, both anchoring device 210 on flexible member 30, and anchoring surface 220 on the interior surface 80 of the rear-facing back portion 60 of case 100, can be made of or coated with a non-slip material (e.g., rubber or silicone) to prevent the flexible member from slipping out of the hole. Anchoring surface 220 on the interior surface 80 of the rear-facing back portion 60 of case 100 can be integral to case 100 or can be applied to interior surface 80 of the rear-facing back portion 60 of case 100, for example with adhesive.

Anchoring device 210 can be permanently attached to flexible member 30, e.g., by glue or stitching, or anchoring device 210 can be repositionable at different points along the length of flexible member 30, such as by use of a buckle (not shown) or another repositionable fastener.

Figure 3A:
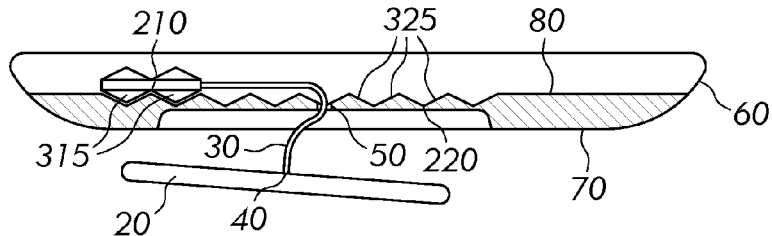
FIGS. 3A and 3B are cross-sectional and side views of additional example embodiments.
Figure 3B:
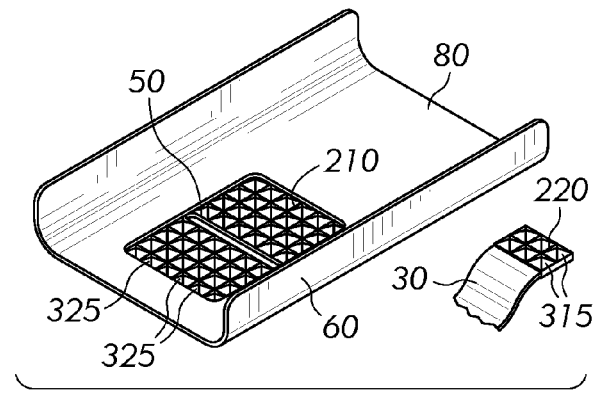

FIGS. 3A and 3B show an embodiment in which anchoring device 210 is permanently attached to flexible member 30. In this embodiment, anchoring device 210 includes a first plurality of teeth or projections 315. A second plurality of teeth 325 is arranged on anchoring surface 220. The first and second pluralities of teeth 315 and 325 interlock when the rear-facing back portion 60 of the case 100 is adjacent to the mobile device, thereby anchoring flexible member 30 to interior surface 80 of the rear-facing back portion 60 of case 100.

In certain example embodiments, the rear-facing back portion of the case (or the anchoring surface if one is used) can include one or more magnets (not shown), and the finger brace can have corresponding magnets aligned so as exert an attractive force on the magnet of the case, so that together they are capable of holding the finger brace to the exterior surface of the rear-facing back portion of the case when the finger brace is not in use. Alternatively, the case can have clips, clasps, snaps, or other fasteners that hold the finger brace in place on the case's exterior surface. Such magnets or other fasteners can be integral to the case or applied to a surface of the case, for example with adhesive.

In certain embodiments, case 100 can be included with the mobile phone apparatus, e.g., packaged or sold with the phone. Secondary protective cases are typically customized to fit one or a few models of mobile devices, as opposed to all types of mobile phones. Referring to FIG. 4B, in this example embodiment, the rear-facing back portion 60 of case 100 includes at least one cutout 450. Cases often require customization to accommodate one or more particular mobile device's cameras, control buttons, ventilation holes, USB outlets, headphone jacks, etc.

For embodiments that work with a secondary protective case, the apparatus can include a case for one or more particular models with a hole for the flexible member in the rear-facing back portion of the case. The holes can be formed in the cases as they are sold by the manufacturer or added after purchase.

The finger-bracing apparatus can be sold with a template, instructions, or tools to allow an end-user to make a hole for the flexible member in a separately acquired case.

In another embodiment, the case can be integral to the mobile device but have a removable rear-facing back portion that can be interchanged with an optional rear-facing back portion that includes the apparatus or a hole for use with the apparatus.

In some embodiments, the exterior surface of the rear-facing back portion of the case, can be textured or coated, or can have ridges, fluting, or scalloping, or can be otherwise shaped or moldable to accommodate the user's fingers as described in connection with the finger-bracing surface.

In the embodiment depicted in FIGS. 1B and 1C, hole 50 is located near the vertical axis of the mobile device when held in portrait fashion and closer to the bottom of case 100 than to the top. The typical human thumb has a range of motion that extends from the ring or middle finger to about three or four finger-widths beyond the index finger. Thus, it is desirable to position hole 50 closer to the bottom of case 100 because it allows many users to reach the entire touchscreen of the mobile device's front-facing display screen. However, the dimensions of different user's hands differ. For example embodiments that require the user to form the hole, the user can customize the position of hole 50 to his or her hand size and shape.

Figure 4A:
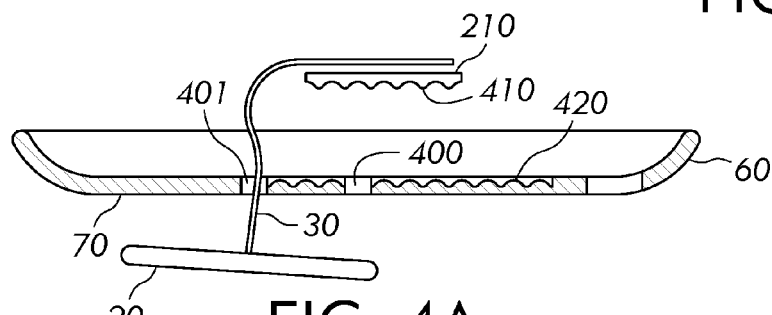
FIGS. 4A-4E show an additional embodiment used with a case having slot-type holes.
Figure 4B:
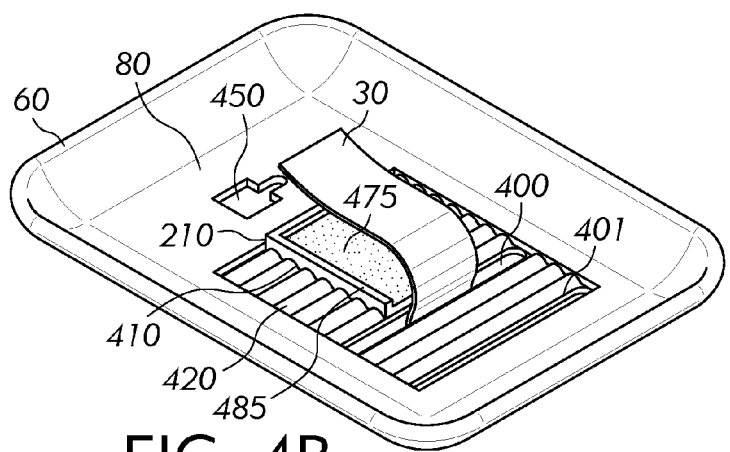
Figure 4C:
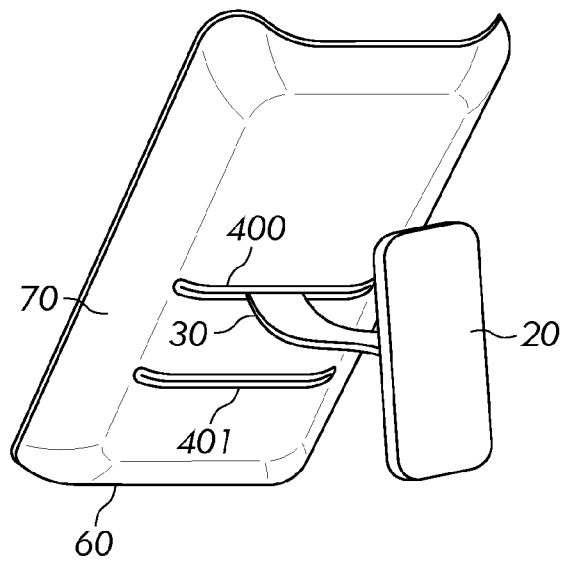

FIGS. 4A-4E depicts an embodiment with multiple holes 400 and 401 in the case. The user can choose one hole for holding the mobile device in portrait mode and a second hole for holding the device in landscape mode. FIG. 4A shows flexible member 30 in hole 401, for example, while FIG. 4B shows flexible member 30 in hole 400. Where the mobile device has more than one user, e.g., a parent and his or her child, and each user prefers the flexible member to be positioned differently because of the different user's hand size, additional holes in the case can be added, to accommodate the multiple users with different preferred hole positions.

Figure 4D:
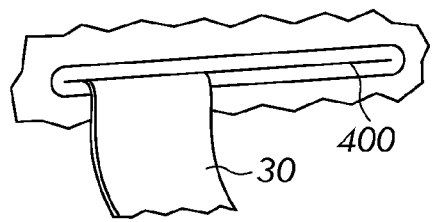
Figure 4E:
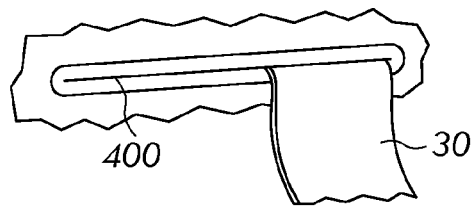

The embodiment shown in FIGS. 4A-4E has slot-type holes 400 and 401 that are significantly wider than the width of flexible member 30, which allows the user to slide flexible member 30 parallel to the lengthwise direction of holes 400 and 401. FIGS. 4D and 4E show close-ups of slot-type hole 400, with flexible member 30 positioned to the left side of slot-type hole 400 in FIG. 4D and to the right side of slot-type hole 400 in FIG. 4E. For example, if the user intends to hold the mobile device in his or her left hand, flexible member 30 used with an embodiment that has a wide hole can be positioned closer to the right side of the rear-facing back portion 60 of the case 100 when viewing the case from the rear. Other embodiments can include a hole (not shown) that extends along the vertical axis of the case when held in portrait orientation, thus allowing the user to reposition the flexible member up or down.

The embodiment shown in FIGS. 4A and 4B includes anchoring device 210 (on flexible member 30), which includes a plurality of parallel of ridges 410 running orthogonally to the length of flexible member 30. What is described in other embodiments as anchoring surface 220 on the interior surface 80 of the rear-facing back portion 60 of case 100, is in the case of FIGS. 4A and 4B a plurality of ridges 420 that run parallel to elongated holes 400 and 401. Ridges 410 and 420 interlock when the interior surface 80 of rear-facing back portion 60 of case 100 is adjacent to the mobile device. Ridges 410 and 420 prevent the anchoring device 210 on the flexible member 30 from slipping through slot-type holes 400 and 401. In addition, ridges 410 and 420 allow anchoring device 210 and flexible member 30 to slide within slot-type holes 400 and 401. An additional advantage of ridges 410 and 420 is that the effective length of flexible member 30 can be adjusted by repositioning anchoring device 210 closer to or farther from slot-type holes 400 and 401. To assist in that goal, ridges 410 and 420 can have different number of ridges; for example, in FIGS. 4A and 4B, there are fewer ridges 410 than ridges 420, allowing movement of anchoring device 210 to different portions of the set of ridges 420, with all ridges 410 still engaged with corresponding ridges 420.

In FIG. 4B, anchoring device 210 has flexible member attachment surface 475 and a skid surface 485 on its back side, i.e., the side opposite ridges 410. Flexible member attachment surface 475 is attached to flexible member 30 by a hook and loop fastener. Such an adjustable fastener allows for a minor adjustment to the effective length of flexible member 30 by adjusting how much of flexible member 30 is attached to anchoring device 210. Skid surface 485, in the view of FIG. 4B, rises above the flexible member attachment surface 475 to an elevation greater than the thickness of flexible member 30, thereby allowing anchoring device 210 to slide laterally, along ridges 420 and along hole 400 or hole 401, with relative ease, because skid surface 485 will slide readily against the flat back surface of the mobile device when case 100 is placed on the back of the mobile device, even though anchoring device 210 is fitted between case 100 and the mobile device.

Figure 5:
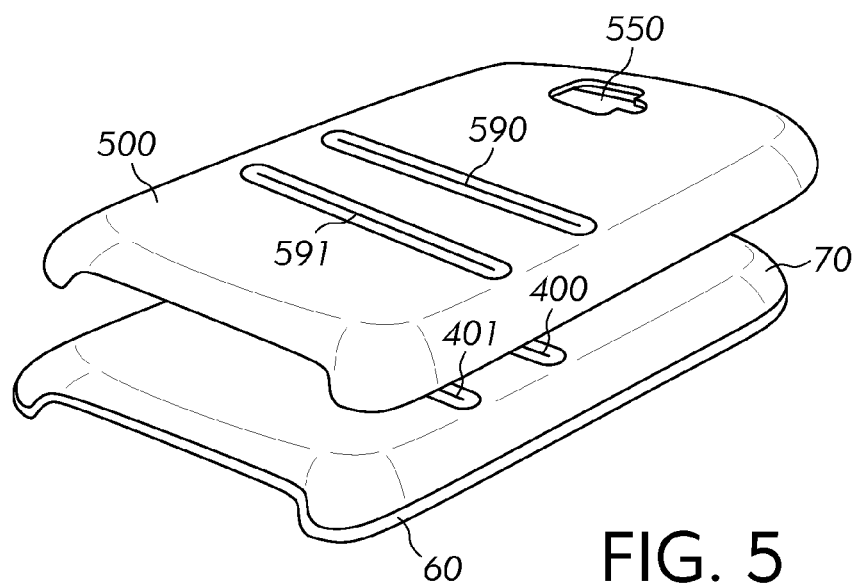
FIG. 5 is an exploded perspective view of a case and a skin covering the case, as used with the embodiment of FIGS. 4A-4E.

FIG. 5 depicts an embodiment that is used with skin 500 that can fit over top of exterior surface 70 of the rear-facing back portion 60 of case 100. Skin 500 has holes 590 and 591 (corresponding to holes 400 and 401) and corresponding cutouts 550 for the mobile device's I/O ports (camera, etc.). Skin 500 can act as a reinforcing structure. In the alternative, skin 500 can serve a partially or purely decorative purpose (e.g., a different color or a decorative pattern), allowing the user to customize the case's appearance.

Skin 500 can clip into place (e.g., pressure-fit over the rear-facing back portion of the case) or can be a decal or sticker held in place with adhesive or static charge. Various materials could be used to form skin 500, for example, rubber over a structural mesh, plastic, leather, rubber, carbon fiber, etc. In embodiments where a soft material is used on the surface of the skin, additional padding for the user's fingers can be provided.

In some embodiments, a reinforcing structure can be affixed to either the internal or external side of the rear-facing back portion of the case. Alternatively, the reinforcing structure can be integral to the rear-facing back portion of the case. The reinforcing structure ensures the case's structural integrity and strengthens the case around the hole or holes.

Figure 6:
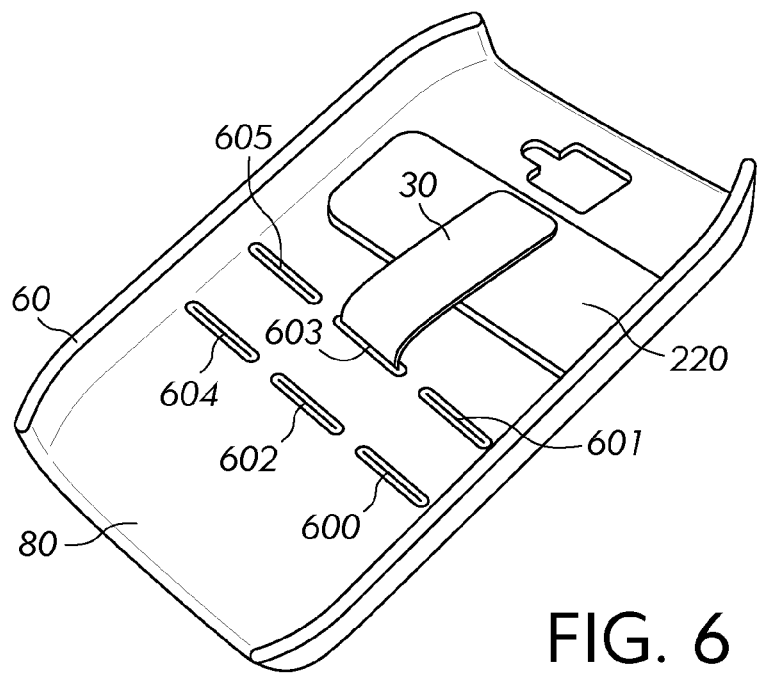
FIG. 6 is a perspective view of an additional embodiment used with a case having a plurality of holes.

FIG. 6 depicts such an example embodiment with a plurality of holes 600 through 605 in the rear-facing back portion 60 of the case 100. In embodiments where holes 600 through 605 are formed by the users, the apparatus can be sold with a multi-holed template to guide the user in making appropriate holes 600 to 605.

Figure 8:
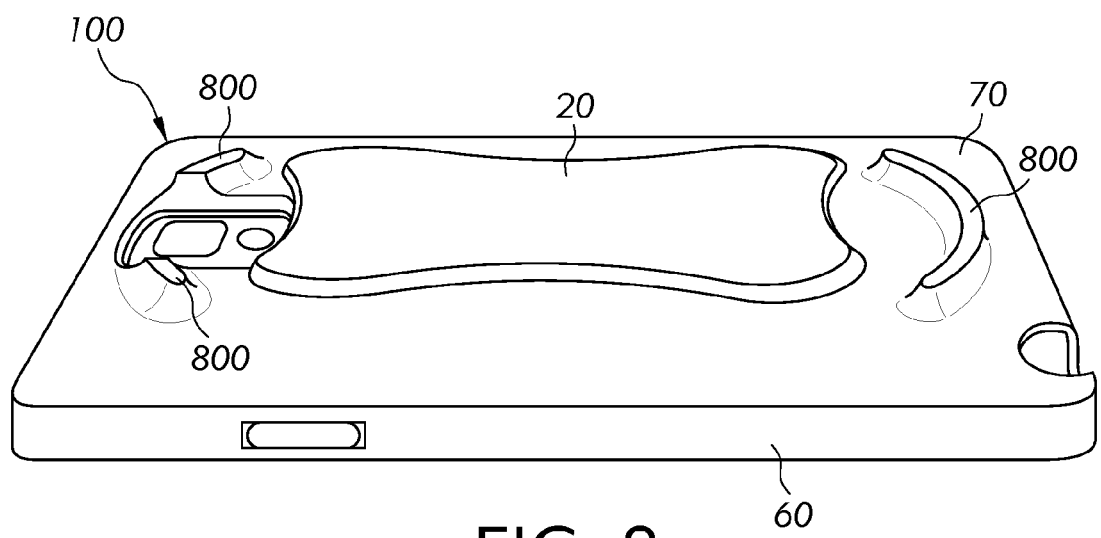
FIG. 8 is a perspective view showing an additional embodiment used with a case having ridges.
Figure 7A:
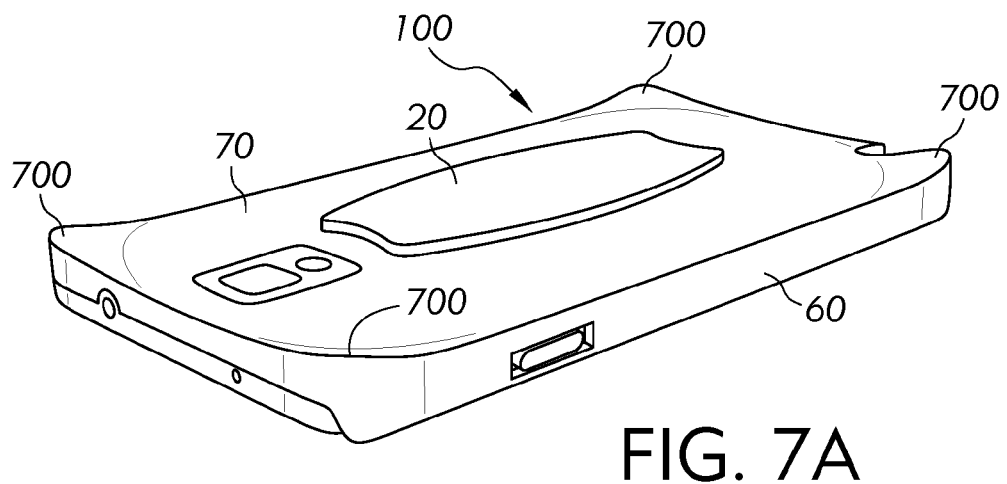
FIGS. 7A and 7C are perspective views showing an additional example embodiment used with a case having ridges on the exterior surface of the case.
Figure 7B:
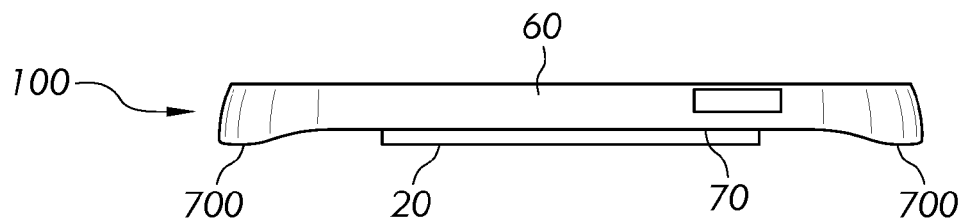
FIG. 7B is a side view showing the embodiment of FIGS. 7A and 7C.
Figure 7C:
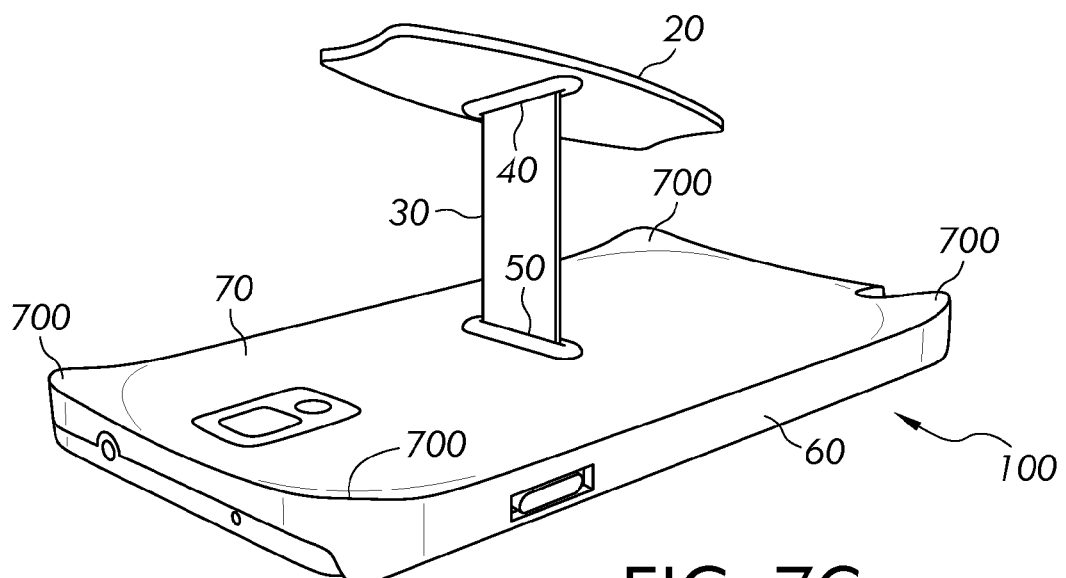

FIGS. 7A-7C show an example embodiment where the external surface 70 of the rear-facing back portion 60 of the case 100 includes ridges 700 that rise to the height of the finger brace when it is adjacent to the exterior surface of the case. As can be seen in FIG. 7B, the ridges allow the mobile device's case to lie flat on a surface such as a desk or table without unevenness or wobble caused by the flexible member. FIG. 8 shows an alternate example of an embodiment with similar ridges 800.

Figure 9:
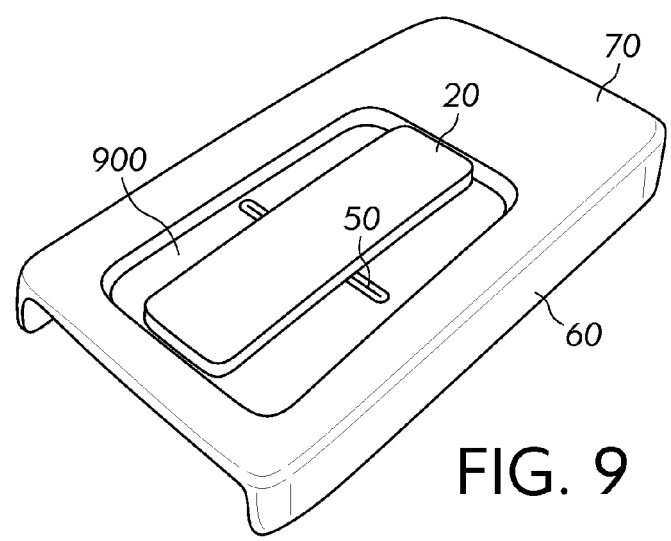
FIG. 9 is a perspective view of an additional embodiment used with a case that has a recess in the exterior surface.

FIG. 9 shows an embodiment where recess 900 in the exterior surface of the rear-facing back portion of the case allows the finger brace to lie flush with the exterior surface. Such an embodiment likewise allows the case of the mobile device to lie flat on a resting surface.

Figure 10A:
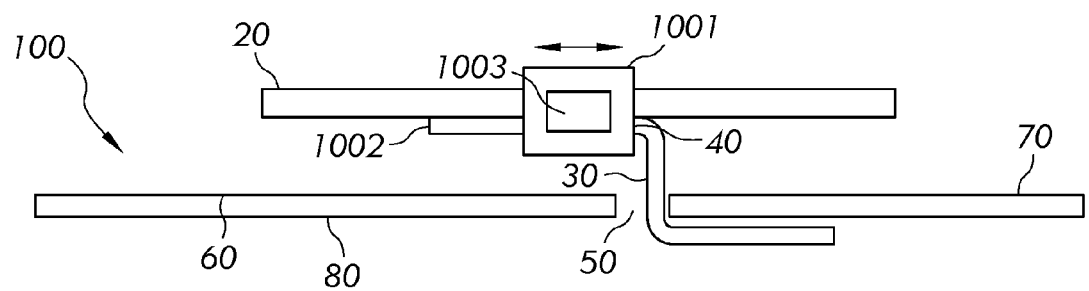
FIGS. 10A and 10B show an additional embodiment with a finger brace that enables adjustment of the length of the flexible member.
Figure 10B:
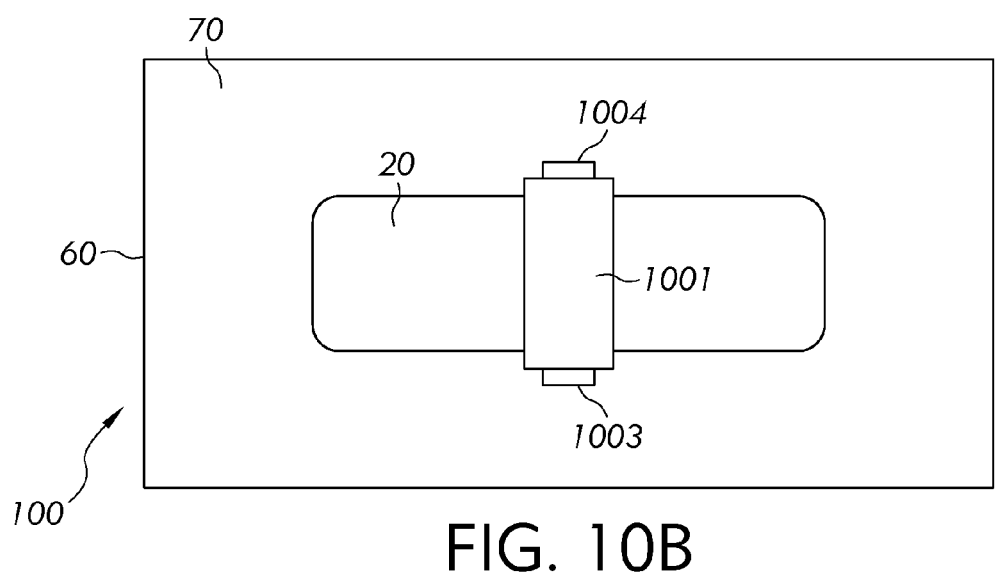

FIGS. 10A and 10B show an embodiment with sleeve 1001. Flexible member 30 is attached to finger brace 20 at attachment point 1002. Sleeve 1001 is slidable in the lengthwise direction of finger brace 20 from attachment point 1002 to intermediate point 40 and holds the portion of flexible member 30 between attachment point 1002 and intermediate point 40 against finger brace 20, thereby adjusting the effective length of flexible member 30 (i.e., the length from intermediate point 40 to hole 50).

Sleeve 1001 includes a locking mechanism to secure it in place once the user has adjusted the length of flexible member 30. The locking mechanism has release button 1003 to unlock the locking mechanism and allow the length to be adjusted. The locking mechanism can have second release button 1004 (see FIG. 10B) depressed simultaneously with release button 1003.

Figure 21:
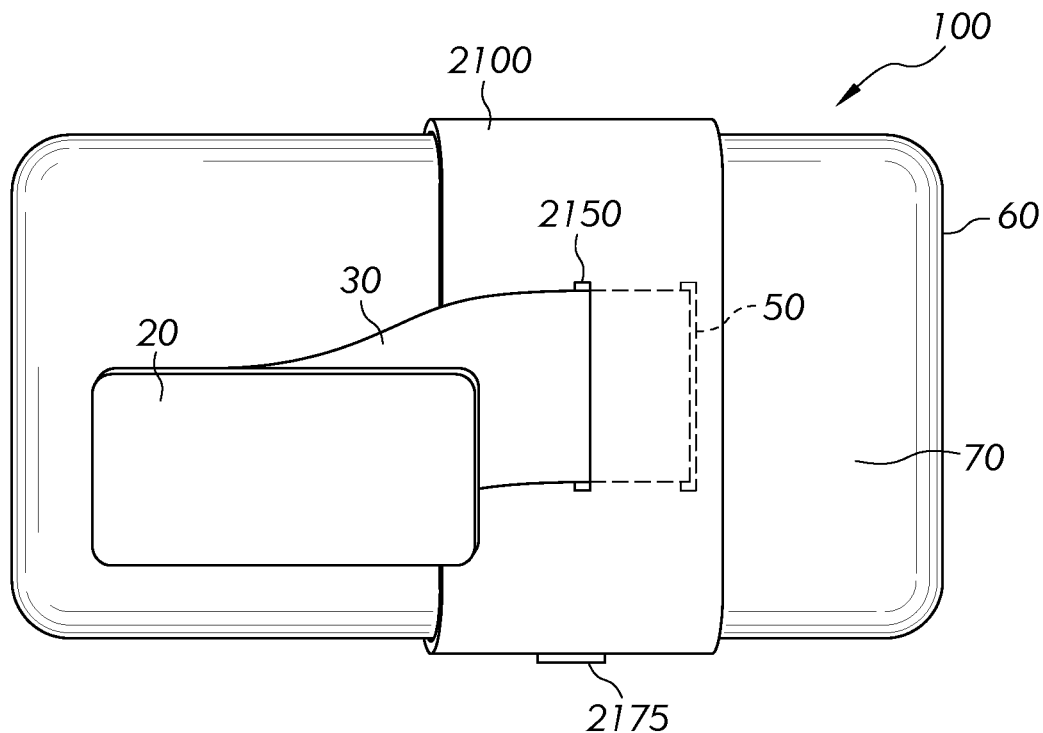
FIG. 21 shows an embodiment where a sleeve on the case enables adjustment of the length of the flexible member.
Figure 22:
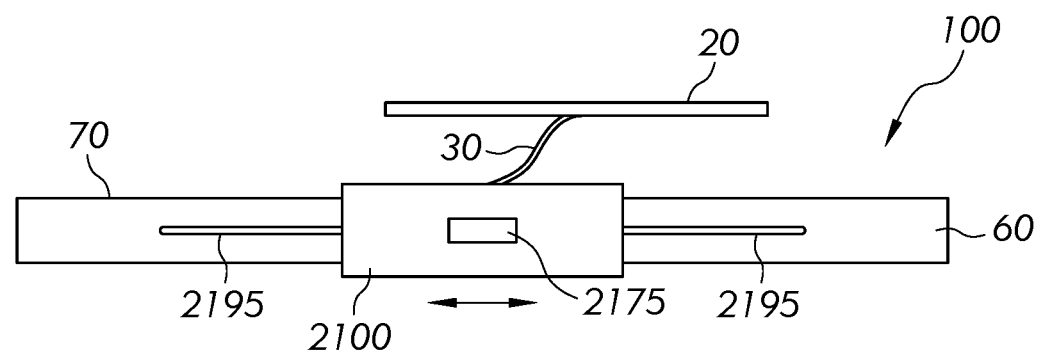
FIG. 22 shows a side view of the embodiment depicted in FIG. 21.

FIGS. 21 and 22 show an embodiment with sleeve 2100 that is coupled to case 100 but is capable of sliding in the longer dimension of case 100. Sleeve 2100 can slide, for example, on rails or grooves 2195 in case 100, and a locking mechanism (not shown) can prevent sleeve 2100 from sliding relative to case 100 when sleeve 2100 is positioned in the desired location. The locking mechanism can be disengaged by pressing lock release button 2175. In the embodiment shown, sleeve 2100 contains hole 2150. FIG. 21 depicts a portion of flexible member 30 beneath sleeve 2100 that runs between hole 50 in case 100 and hole 2150 in sleeve 2100. Hole 50 and the portion of flexible member 30 that runs between hole 50 and hole 2150 are shown in dashed lines to indicate that they lie beneath sleeve 2100. Sliding sleeve 2100 relative to case 100 allows the user to reposition the effective anchoring point of flexible member 30 (i.e., where flexible member 30 couples to case 100) while shortening or lengthening the effective length of flexible member 30.

FIG. 22 shows the embodiment of FIG. 21 in side view. A rail or groove 2195 is shown on the side of case 100, but other embodiments show a similar rail or groove on the front-facing portion of case 100. In still further embodiments, no rails or grooves are used, rather sleeve 2100 simply wraps around the front-facing portion of case 100 to grip case 100 without obscuring any portion of the front-facing display screen.

Figure 11A:
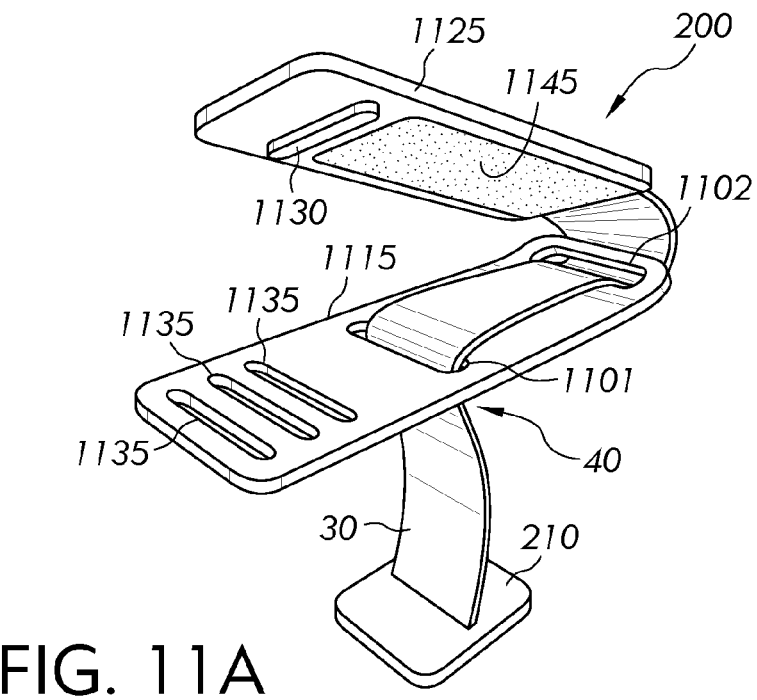
FIGS. 11A, 11B, and 11C are perspective and side views of an additional embodiment with a finger brace that enables adjustment of the length of the flexible member.
Figure 11B:
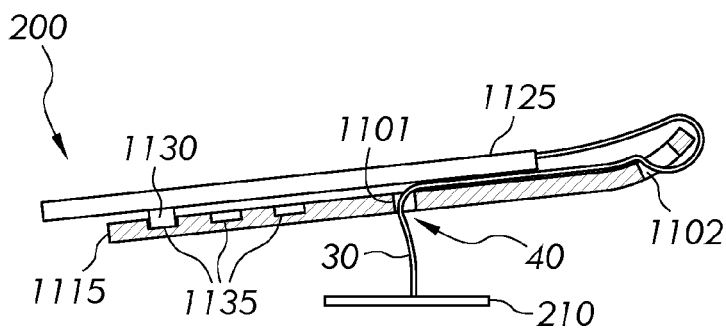
Figure 11C:
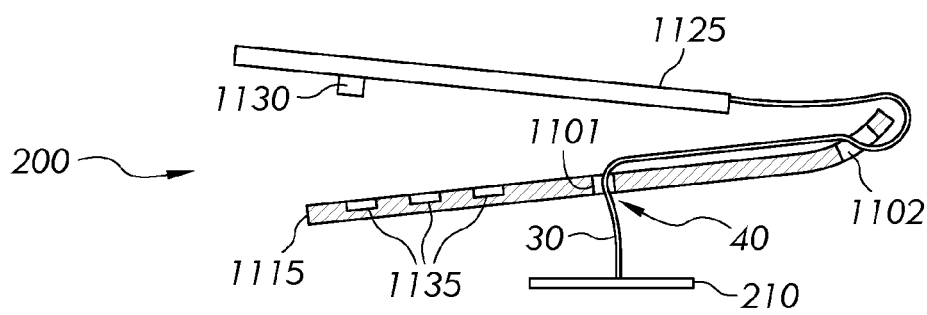

FIGS. 11A, 11B, and 11C show an embodiment where finger brace 200 includes a buckle that allows adjustment of the length of flexible member 30. FIG. 11A shows buckle-type finger brace 200 in an open position. Flexible member 30 is routed through first slot 1101 and second slot 1102 in the finger brace's lower portion 1115 and connected to the finger brace's upper portion 1125. First slot 1101 is at intermediate point 40. Clasp member 1130 on upper portion 1125 engages with one of a plurality of clasping holes 1135 in lower portion 1115. The plurality of clasping holes 1135 allows the length of flexible member 30 to be adjusted. Upper portion 1125 can have retaining surface 1145 to provide extra hold to maintain the selected length of flexible member 30.

FIG. 11B shows a cross sectional view of an embodiment with buckle-type finger brace 200 in a closed position. FIG. 11C shows a similar embodiment in cross section with buckle-type finger brace 200 in the open position.

Figure 12A:
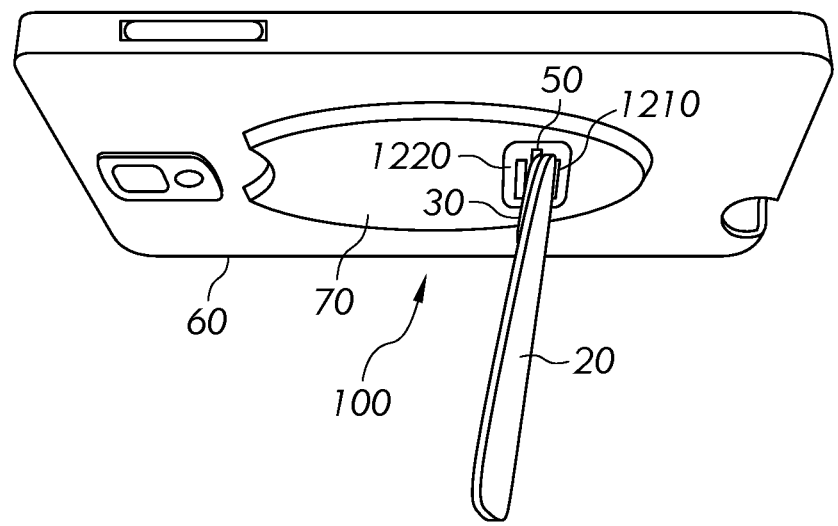
FIGS. 12A and 12B are perspective views showing an additional embodiment where the finger brace can used as a stand.
Figure 12B:
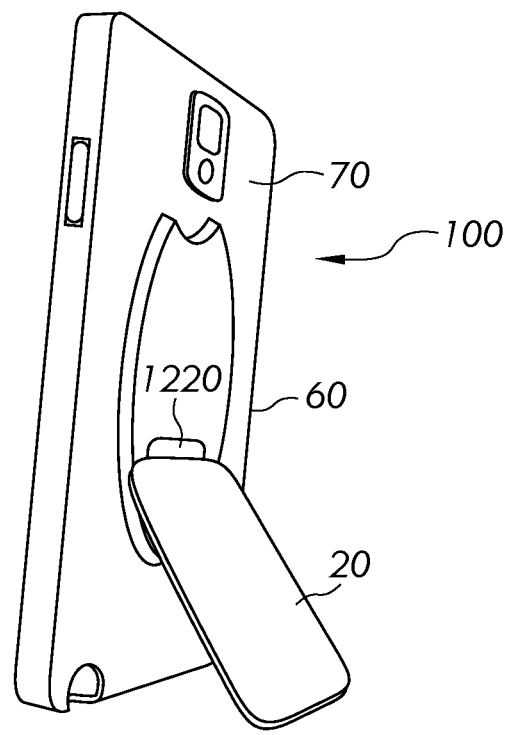
Figure 20:
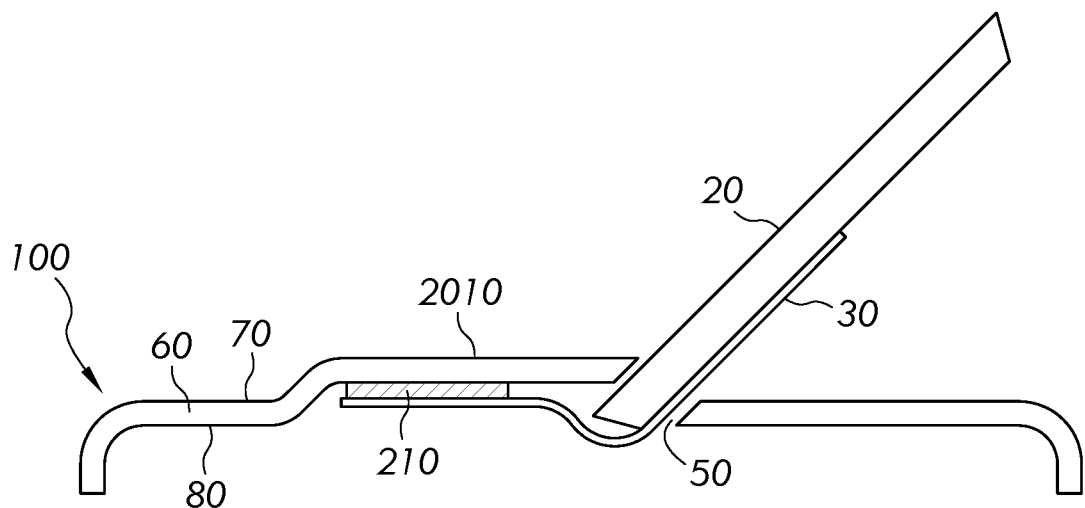
FIG. 20 is a cross-sectional view showing another embodiment in which the finger brace can be used as a stand.

FIGS. 12A and 12B depict an example embodiment where finger brace 20 can be used as a stand. In some embodiments, a tab or projection on finger brace 20 can be placed into hole 50 (as shown in FIG. 20). However, in the example embodiment shown in FIG. 12A, finger brace 20 as a whole is fitted into notch or indentation 1210 in the exterior surface 70 of the rear-facing back portion 60 of case 100. The stand can be used to support the mobile device in either portrait or landscape orientation. The exterior surface 70 of the rear-facing back portion 60 of case 100 can be equipped with a second notch or indentation 1220, which allows finger brace to engage the exterior surface 70 at a different angle than when the first slot is used. The difference in the angle will increase or decrease the angle at which the mobile device is held off of the desk or other flat surface, depending whether portrait or landscape mode is used. A wider angle used in landscape mode will create a wider angle between the mobile device and the flat surface. On the other hand, a wider angle in landscape mode will result in a narrower angle between the mobile device and the flat surface. Notches 1210 and 1220 can instead be near different edges of the mobile device, at 90 degrees from each other, thus alternatively allowing for support in both landscape and portrait mode.

Figure 19:
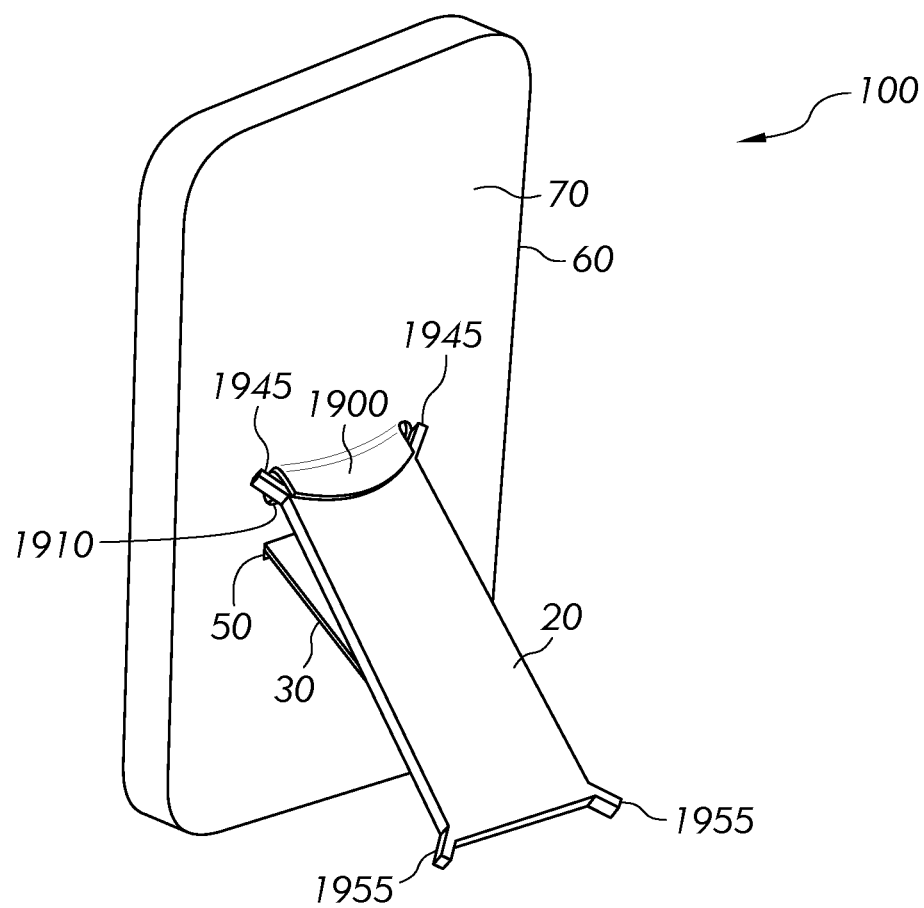
FIG. 19 is a perspective view showing an embodiment in which the finger brace can used as a stand.

FIG. 19 shows an alternative embodiment where finger brace 20 can be used as a stand. Although FIG. 19 shows the stand orienting the mobile device in portrait mode, the features discussed here could be located differently, so as to allow the stand to orient the mobile device in landscape mode instead. In the example embodiment of FIG. 19, exterior surface 70 of rear-facing back portion 60 of case 100 includes tab 1900. Tab 1900 may be rigid or completely pliable. In certain embodiments, tab 1900 may be pliable, in which case it lies flush with exterior surface 70 until it is peeled back by the user. Slot 1910 is formed in case 100 just below tab 1900. One end of finger brace 20 can be inserted into slot 1910, allowing finger brace 20 to act as a stand for the mobile device. Some embodiments may include projections 1945 on the ends of finger brace 20, which provide additional stability for finger brace 20 when it is acting as a stand. Projections 1945 form a complimentary shape to tab 1900, allowing the end of finger brace 20 that is inserted into slot 1910 to mate with the shape of tab 1900 so as to facilitate the end of finger brace 20 being retained in slot 1910. In addition, optional matching projections 1955, on the opposite end of finger brace 20, can add stability by acting as feet. In the case where the stand can hold the mobile device in the opposite direction, such as if the stand is designed to orient the mobile device in landscape mode with either edge at the top, then projections 1955 can swap locations with projections 1945 to achieve the opposite orientation. If tab 1900 and slot 1910 are positioned off-center or angled, it may be desired to have another tab/slot pair (not shown) at a transposed location to assist in reversing the orientation.

FIG. 20 shows a cross-sectional view of a different embodiment, also in which finger brace 20 can act as a stand, but in this embodiment, finger brace 20 is inserted into hole 50, rather than needing a dedicated slot. The embodiment of FIG. 20 depicts projection 2010, which can be a section of exterior surface 70 of rear-facing back portion 60 of case 100 that is raised above the rest of exterior surface 70, thereby providing extra depth to hole 50 to receive finger brace 20. In addition, projection 2010 can create room to accommodate anchoring device 210 (discussed above) within case 100. In embodiments having relatively wide slot-type holes such as holes 400 and 401 shown in FIG. 4C, projection 2010 also provides sufficient volume to allow flexible member 30 to slide along the hole.

Figure 13:
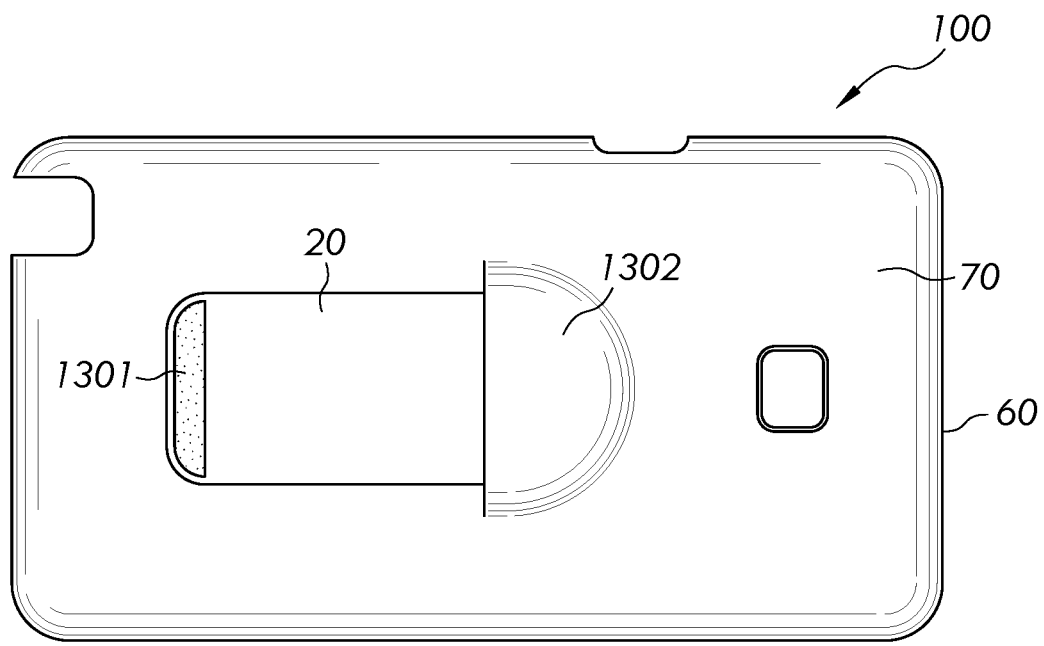
FIG. 13 shows an additional embodiment in which the finger brace can be used as a belt clip.

FIG. 13 shows an example embodiment in which finger brace 20 can be used as a belt clip. A first edge 1301 of finger brace 20 is fitted over an edge of a belt, a waist of a pair of pants, an edge of a shirt pocket, or the like. In some embodiments where finger brace 20 is used as a clip, the arrangement would cause flexible member 30 to rest against the edge of the material to which the embodiment is clipped, and that would in turn pull finger brace 20 against that material, thus clipping the mobile device in place. However, when finger brace 20 is clipped over a belt, weight of the mobile device can cause the upper end of the mobile device to rotate downward. Such a configuration can cause the mobile device to be held at an outward angle, thereby giving a greater chance of the device falling or pulling the belt or shirt pocket.

In the embodiment depicted in FIG. 13, the edge of finger brace 20 opposite first edge 1301 can be placed into pocket 1302 near the hole. Embodiments that include such a pocket prevent the mobile device from rotating outward, allowing the weight of the mobile device to rest more directly on top of the belt or shirt pocket. First edge 1301 of finger brace 20 can be covered with metal or another hard material to prevent wear and to guide the finger brace over the belt.

It is intended that equivalents of the disclosed example embodiments and methods shall fall within the scope of the present disclosure or appended claims. It is intended that the disclosed example embodiments and methods, and equivalents thereof, can be modified while remaining within the scope of the present disclosure or appended claims.

In the foregoing Detailed Description, various features can be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶ 6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶ 6 are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An apparatus to assist a user with holding a mobile device having a front-facing display screen and a rear-facing back, the apparatus also forming a stand for the mobile device, the apparatus comprising:
   a. a case couplable to the mobile device and covering at least part of the back of the mobile device;
   b. a substantially inflexible finger brace; and
   c. an elastic member anchored to the case and coupled to the finger brace;
   d. wherein the case has a recess sized to hold a first end of the finger brace; and
   e. wherein the finger brace and the elastic member are configured, including the length of the elastic member between the case and the finger brace, so as:
      i. when the one hand is holding the mobile device, to position the finger brace relative to the case such that at least one finger of one hand of the user can press against the finger brace and place the elastic member under tension to brace the mobile device, and
      ii. when the first end of the finger brace is in the recess, to hold the finger brace in tension against the case with a second end of the finger brace spaced from the case;
   whereby the apparatus both (A) facilitates one-handed use of the mobile device by allowing the user to hold the mobile device while leaving a thumb of the user's one hand free to operate the mobile device and (B) forms a stand allowing use of the mobile device without holding the mobile device.

2. The apparatus of claim 1 further comprising a clip coupled to finger brace and configured to retain a portion of the elastic member, whereby the length of the elastic member is adjustable by increasing and decreasing the portion of the elastic member retained by the clip.

3. The apparatus of claim 1 wherein the case is an integral part of the mobile device.

4. The apparatus of claim 3 wherein the mobile device is a mobile phone.

5. The apparatus of claim 1 wherein the case is a secondary case that is not an integral part of the mobile device.

6. The apparatus of claim 5 wherein the secondary case covers only a portion of the back of the mobile device.

7. The apparatus of claim 1 wherein the case is contoured so that a first portion of the case extends away from the mobile device to a distance at least as great as the sum of (i) the distance that a second portion of the case extends away from the mobile device and (ii) a thickness of the finger brace, and wherein the case, the elastic, and finger brace are structured to allow the finger brace to be retracted adjacent to the second portion of the case, whereby, when the finger brace is thus retracted, the first portion of the case can support the mobile device on a flat surface with the display screen facing upward.

8. The apparatus of claim 7 wherein the first portion surrounds the second portion, so that the finger brace can be retracted into a cavity, and wherein, when the finger brace is retracted adjacent to the second portion of the case, surfaces of the first portion and of the finger brace farthest from the mobile device together form a substantially flat surface.

9. The apparatus of claim 1 wherein:
   f. the recess comprises an indentation in the case;
   g. the finger brace has a tab at the first end of the finger brace; and
   h. wherein the indentation and the tab are of complementary shapes.

10. The apparatus of claim 1 further comprising a pocket disposed on an exterior surface of the case and sized and positioned to receive an end of the finger brace when the finger brace is retracted adjacent to the case.

11. The apparatus of claim 1 wherein the recess comprises a hole in the case through which the elastic member extends.

12. A method of manipulating a mobile device having a front-facing display screen and a rear-facing back with aid of an apparatus comprising:
   1. a case couplable to the mobile device and covering at least part of the back of the mobile device;
   2. a substantially inflexible finger brace; and
   3. an elastic member anchored to the case and coupled to the finger brace;
   4. wherein the case has a recess sized to hold a first end of the finger brace; and
   5. wherein the finger brace and the elastic member are configured, including the length of the elastic member between the case and the finger brace, so as:
      a. when the one hand is holding the mobile device, to position the finger brace relative to the case such that at least one finger of one hand of the user can press against the finger brace and place the elastic member under tension to brace the mobile device, and
      b. when the first end of the finger brace is in the recess, to hold the finger brace in tension against the case with a second end of the finger brace spaced from the case;

the method comprising:
   (a) inserting at least one finger between the finger brace and the case;
   (b) bracing the at least one finger against the finger brace;
   (c) operating the mobile device with the thumb of the user's one hand;
   (d) inserting the first end of the finger brace into the recess; and
   (e) placing the mobile device on a flat surface, using the apparatus as a stand.

13. The method of claim 12 wherein inserting at least one finger between the finger brace and the case comprises inserting a first finger on one side of the elastic member and a second finger on an opposite side of the elastic member.

14. The method of claim 12 wherein all fingers inserted between the finger brace and the case are placed only on one side of the elastic member, and further comprising, on the opposite side of the elastic member, holding at least another finger of the hand against a surface of the finger brace farthest from the mobile device so as to press one end of the finger brace against the case.

15. The method of claim 12 wherein the recess comprises a hole in the case through which the elastic member extends.

16. The method of claim 12:
   (f) wherein the apparatus further comprises a clip coupled to finger brace and configured to retain a portion of the elastic member, and
   (g) further comprising adjusting the length of the elastic member by changing the portion of the elastic member retained by the clip.

* * * * *

UNITED STATES PATENT AND TRADEMARK OFFICE
CERTIFICATE OF CORRECTION

PATENT NO.         : 9,647,714 B2
APPLICATION NO.    : 15/081610
DATED              : May 9, 2017
INVENTOR(S)        : Allen Hirsch Page 1 of 2

It is certified that error appears in the above-identified patent and that said Letters Patent is hereby corrected as shown below:

In the Drawings

Sheet 3, Fig. 3B, change reference numeral "210" to --220--
Sheet 3, Fig. 3B, change reference numeral "220" to --210--

In the Specification

At Column 1, Lines 47-48, change "supporting use of" to --supporting the use of--
At Column 2, Line 34, change "additional example embodiments" to --an additional example embodiment--
At Column 2, Line 59, change "can used" to --can be used--
At Column 3, Line 8, change "can used" to --can be used--
At Column 4, Line 36, change "end points" to --the end points--
At Column 6, Line 49, change "alligned so as exert" to --alligned so as to exert--
At Column 8, Line 13, change "number" to --numbers--
At Column 8, Line 17, change "corresponding ridges 420" to --corresponding ones of ridges 420--
At Column 10, Line 4, change "cross sectional" to --cross-sectional--
At Column 10, Line 19, change "finger brace" to --finger brace 20--
At Column 10, Line 20, change "slot" to --notch or indentation 1210--
At Column 10, Line 23, change "depending whether" to --depending on whether--
At Column 10, Line 26, change "landscape" to --portrait--
At Column 10, Line 48, change "complimentary" to --complementary--
At Column 11, Line 17, change "that would in turn pull" to --that would, in turn, pull--
At Column 11, Line 19, change "weight of" to --the weight of--

In the Claims

At Column 12, Line 46 (Claim 1), change "when the one hand is" to --when one hand of the user is--
At Column 12, Line 48 (Claim 1), change "finger of one hand" to --finger of the one hand--

Signed and Sealed this
Thirty-first Day of July, 2018

Andrei Iancu
*Director of the United States Patent and Trademark Office*

At Column 12, Line 62 (Claim 2), change "to finger brace" to --to the finger brace--
At Column 13, Line 10 (Claim 7), change "the distance" to --a distance--
At Column 13, Line 12 (Claim 7), change "the elastic" to --the elastic member--
At Column 13, Line 12 (Claim 7), change "finger brace" to --the finger brace--
At Column 13, Line 28 (Claim 9), delete "wherein"
At Column 14, Line 4 (Claim 12), change "when the one hand is" to --when one hand of the user is--
At Column 14, Line 6 (Claim 12), change "finger of one hand" to --finger of the one hand--
At Column 14, Line 14 (Claim 12), change "inserting at least one" to --inserting the at least one--
At Column 14, Line 18 (Claim 12), change "with the thumb" to --with a thumb--
At Column 14, Line 19 (Claim 12), delete "user's"
At Column 14, Line 33 (Claim 14), change "finger of the hand" to --finger of the one hand--
At Column 14, Line 40 (Claim 16), change "to finger brace" to --to the finger brace--